Jan. 5, 1965     C. W. MacMILLAN     3,164,003
PORTABLE SHOCK ABSORBER TESTER
Filed Feb. 19, 1960     5 Sheets-Sheet 1
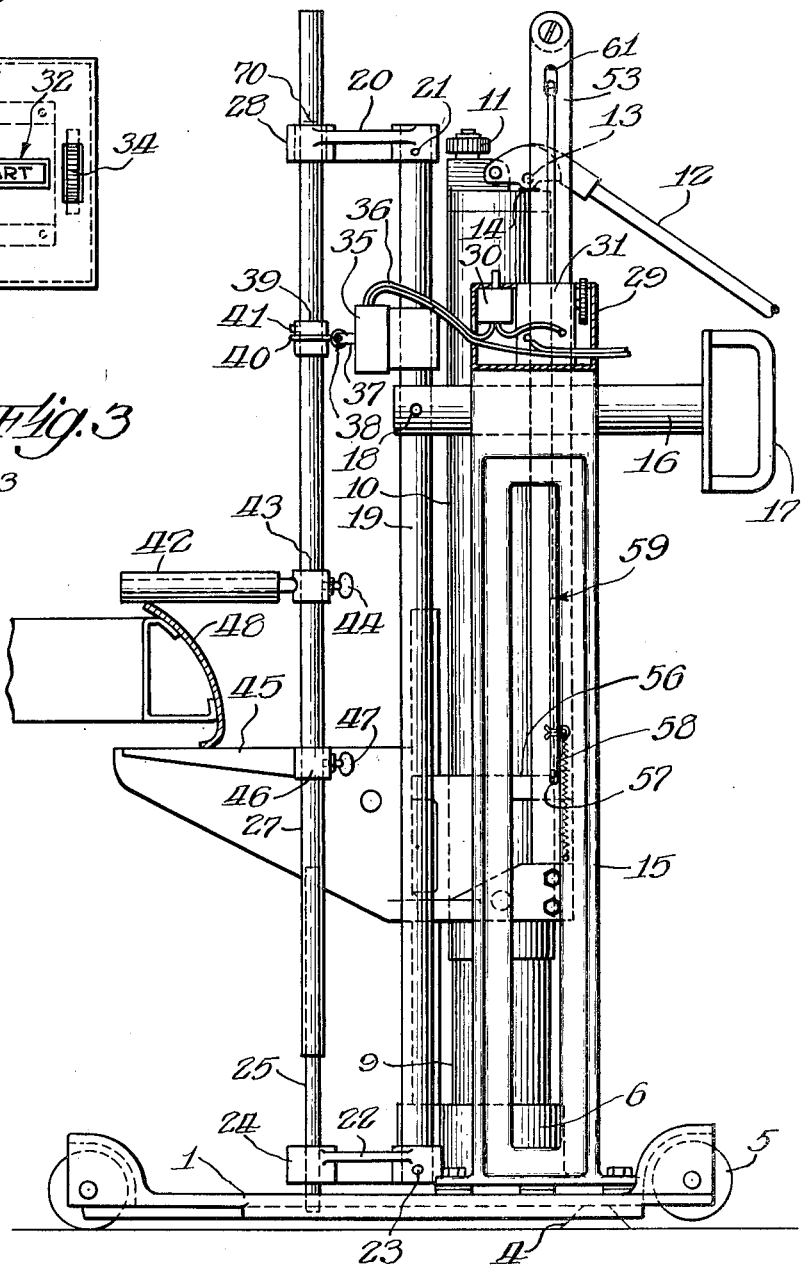
Inventor:
Charles W. MacMillan
By Gary, Desmond & Parker attys.

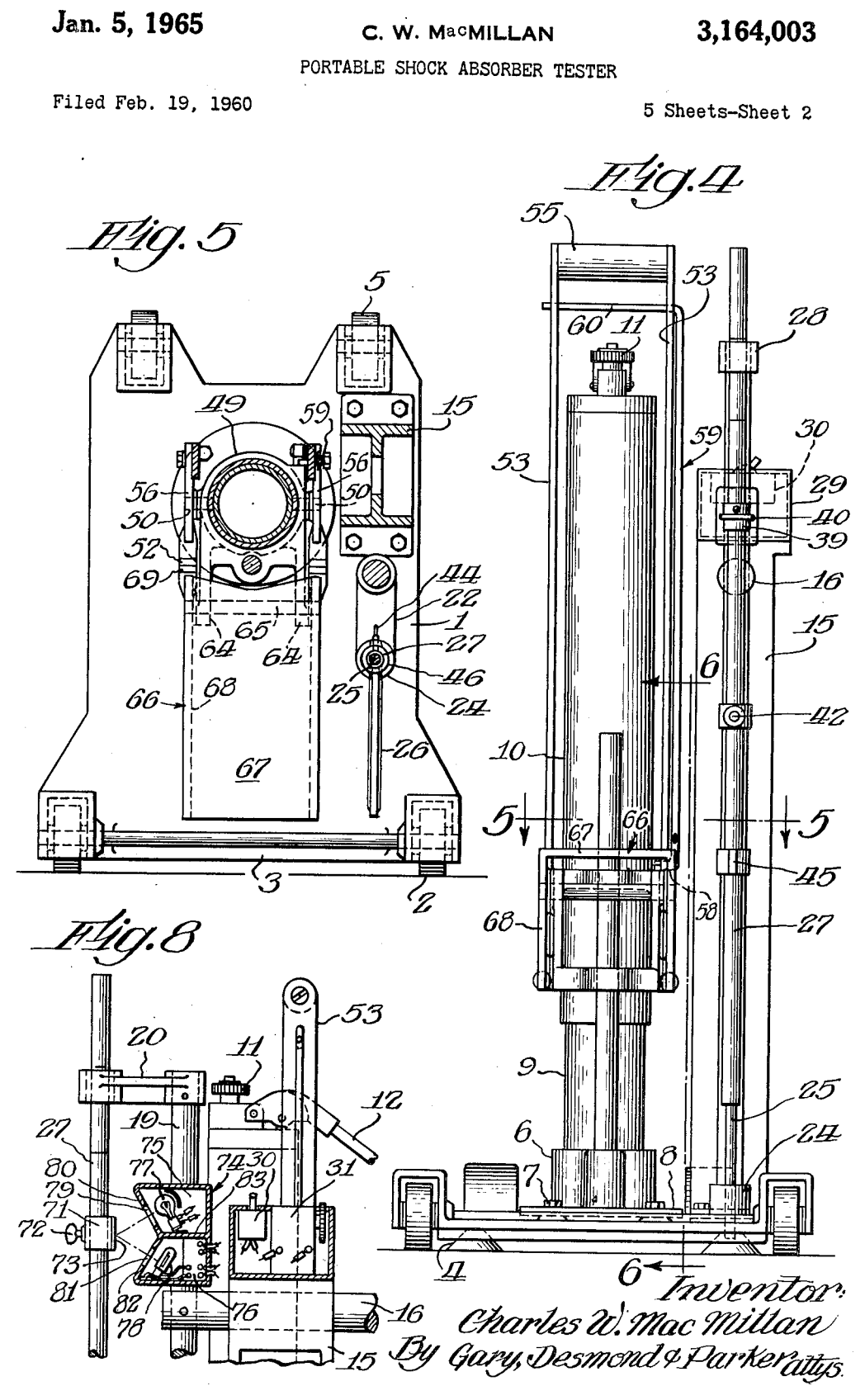

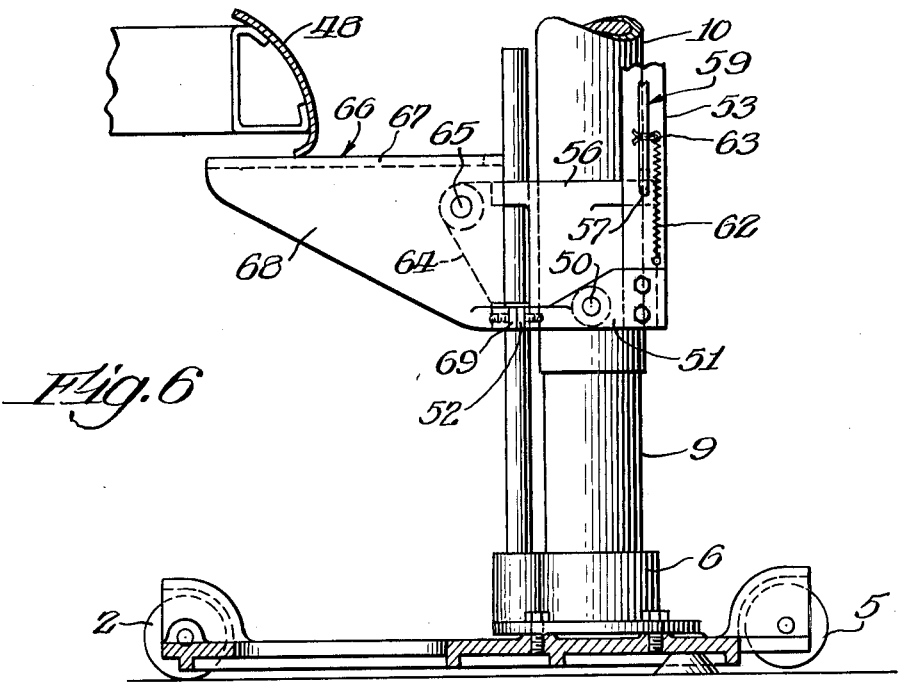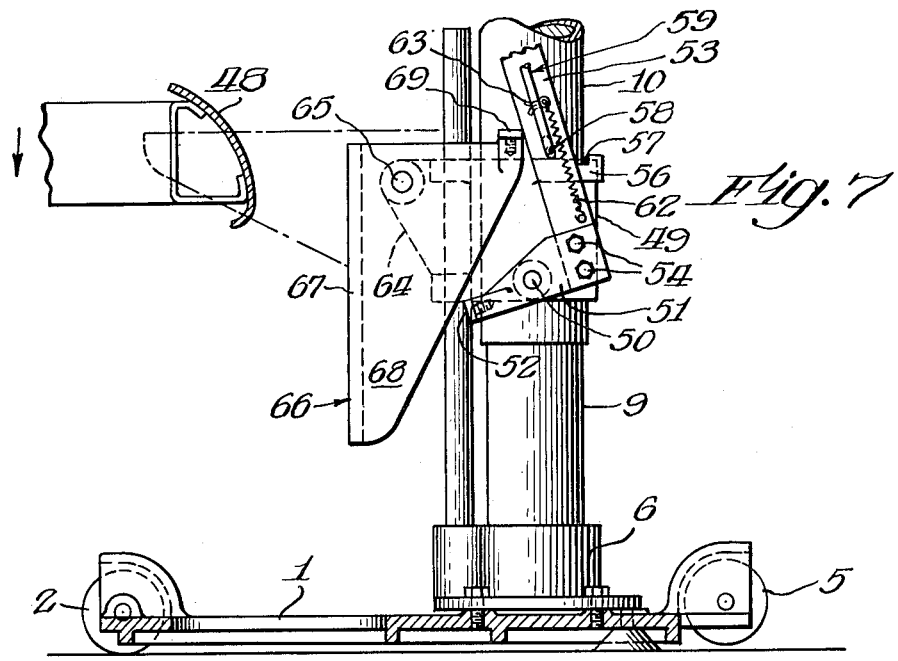

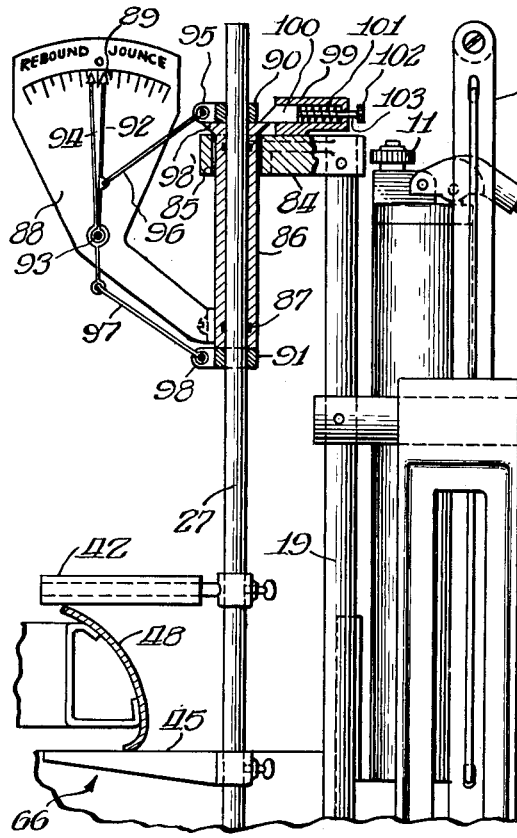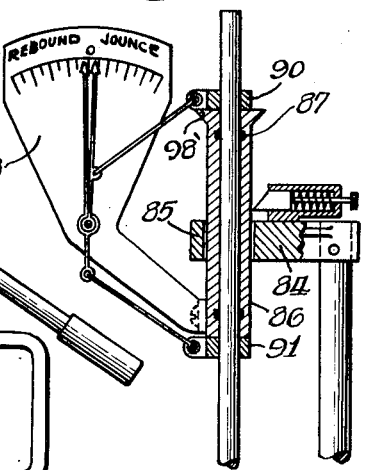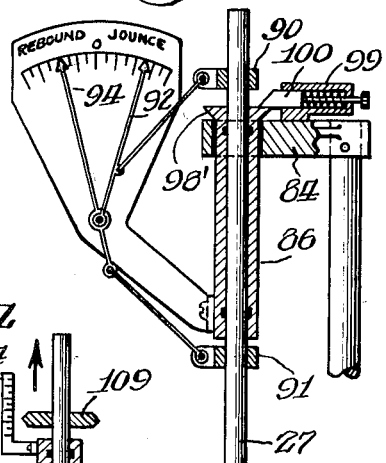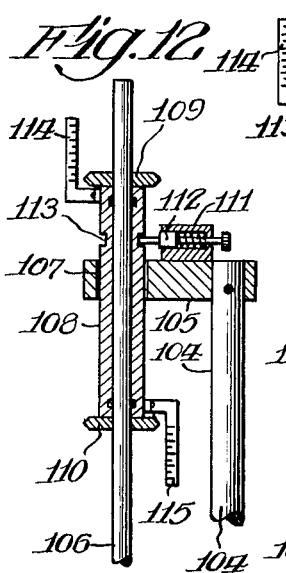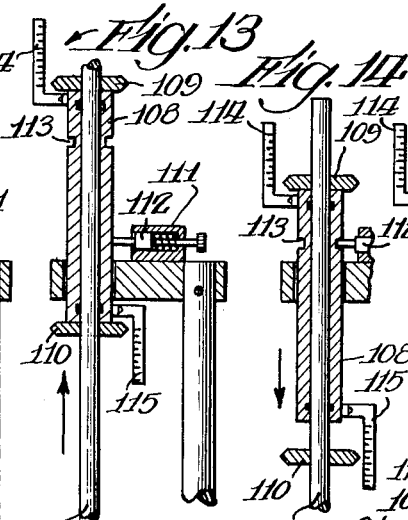

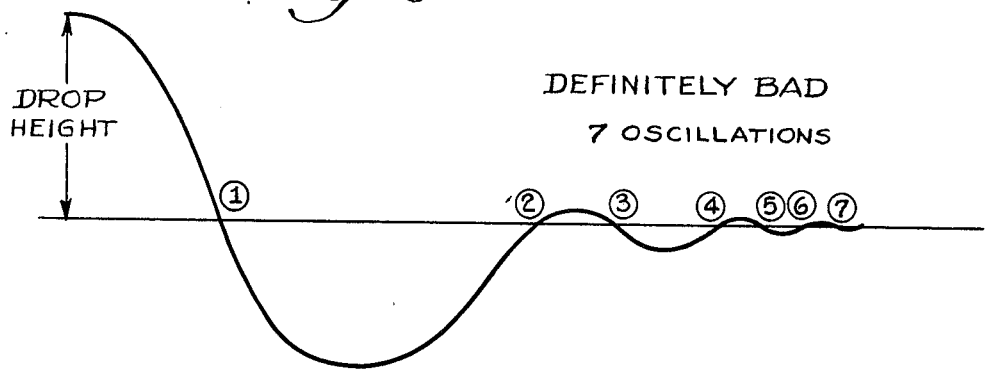
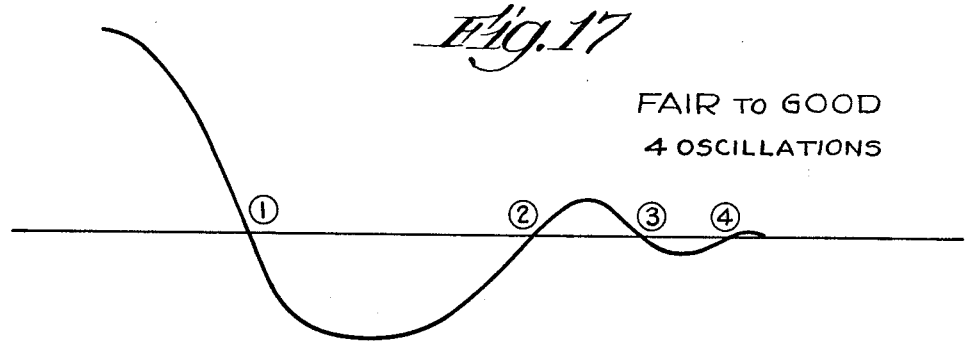
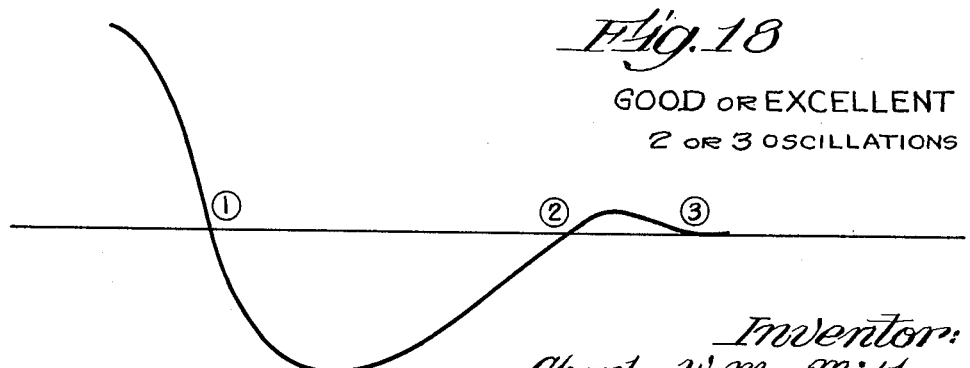

United States Patent Office 3,164,003
Patented Jan. 5, 1965

3,164,003
PORTABLE SHOCK ABSORBER TESTER

Charles W. MacMillan, Rock Island, Ill., assignor to Bear Manufacturing Company, Rock Island, Ill., a corporation of Delaware
Filed Feb. 19, 1960, Ser. No. 9,944
4 Claims. (Cl. 73—11)

This invention relates to improvements in a device for testing shock absorbers for automotive vehicles and refers particularly to a shock absorber tester which may test shock absorbers while they are in situ upon the automobile.

One of the important features of the present invention resides in a portable testing device which may be brought into testing relationship with the shock absorber of an automobile without removing the shock absorber from the vehicle.

Another important feature of the present invention resides in mechanism which may be quickly and conveniently associated with a bumber or other sprung portion of the automobile whereby the "jounce" or original impulse applied to the shock absorber, and the rebound may be measured.

Other features and advantages of the present invention will be apparent from the accompanying drawings and following detailed description.

In the drawings:

FIG. 1 is a side elevational view of my improved shock absorber testing device.

FIG. 2 is a top plan view of one indicating device that may be employed with the tester illustrated in FIG. 1.

FIG. 3 is a top plan view of a development of the calibrated drum employed in the indicating device shown in FIG. 2.

FIG. 4 is a front elevational view of the device shown in FIG. 1.

FIG. 5 is a transverse sectional view taken on line 5—5 of FIG. 4.

FIG. 6 is an enlarged fragmentary elevational view of the device showing certain parts in pretesting relationship.

FIG. 7 is a view similar to FIG. 6 showing the parts in testing position.

FIG. 8 is a fragmentary view of the upper portion of the testing device illustrating, in section, a modified indicator actuating device.

FIG. 9 is a fragmentary side elevational view showing a first preferred indicating device for the tester.

FIGS. 10 and 11 are similar views of the upper portion of the device shown in FIG. 9 illustrating the pretesting position and the testing position, respectively, of certain parts of the indicator.

FIGS. 12, 13, 14 and 15 are fragmentary views of a second preferred indicating mechanism, the mechanism being shown in a series of positions prior and during the testing period.

FIGS. 16, 17 and 18 graphically illustrate test results produced in the practice of the present invention.

Referring in detail to the drawings, 1 indicates a platform upon which the device comprising the present invention is carried. The platform 1 is mounted, at its front end, upon rollers or wheels 2 rotatably mounted upon axle 3. Adjacent the rear end of the platform spaced, conically shaped supports 4 are carried whereby when the platform is substantially horizontal or parallel to a supporting floor the platform is rendered substantially immovable. Wheels or rollers 5 are carried upon the rear end of the platform but in the normal operative position of the platform said wheels are spaced from the floor. To move the platform, the same may be tilted so as to raise the members 4 from the floor and the platform may while in tilted position be rolled upon either the wheels 2 or the wheels 5.

A blind bushing or tubular socket 6 may be mounted upon the platform 1 and may be secured thereto by screws or bolts 7 which may extend through flange 8 formed integral with the bushing 6. A stationary cylindrical tube 9 is carried by bushing 6 and extends upwardly at right angles to platform 1. A movable cylindrical tube 10 telescopes tube 9 and is movable axially upon the latter tube. The tubes 9 and 10 comprise essentially a conventional hydraulic jack which carries at its upper end, a control valve 11 and a pump handle 12 which is connected, as at 13 in FIG. 1, to a piston rod 14.

The arrangement is such that tube 10 may be raised relative to tube 9 by manipulating or pumping handle 12. To lower the tube 10, the valve member 11 may be manipulated and the tube lowers itself by gravity.

A structural member 15 is positioned on platform 1 adjacent the jack and extends upwardly parallel to the tubes 9 and 10 comprising said jack. An adjusting rod 16 extends transversely through the beam 15 and is longitudinally movable therein. The adjusting rod, at its outer end, carries a handle 17 whereby the rod 16 may be conveniently moved through said beam. At its inner end, rod 16 is secured, by means of a pin 18 to a vertically disposed rod 19. An arm 20 is secured, by means of pin 21, to the upper end portion of rod 19 and a similar arm 22 is secured by pin 23 to the lower end portion of rod 19, arms 20 and 22 being disposed at right angles to rod 19 and substantially parallel to platform 1.

A bushing 24 is formed integral with arm 22 and is secured to guide post 25, the end of which is slidably disposed in a slot 26 (FIG. 5) provided in the upper face of platform 1 whereby said post is constrained to move along the axis of said slot when rod 16 is moved. A tubular member 27 is telescopically movable upon post 25, and, as will be hereinafter more fully described, said member oscillates vertically in response to the periodic movements of the vehicle when the test is performed.

Arm 20 carries an integral bushing 28 at its outer end which slidably embraces the upper portion of member 27. The relationship between member 27 and bushing 28 is such, however, that said member may only be moved longitudinally through the bushing by the exertion of a force in excess of the weight of the member 27 and the devices which it carries; that is, there is frictional engagement between member 27 and bushing 28.

An indicator housing 29 is mounted upon the upper end of beam 15 and said housing contains a master switch 30 and a conventional electrically operated counter 31. The counter 31 carries the usual drum 32 which is rotated stepwise in response to electrical impulses. However, the face of the drum carries calibrations 33 which may comprise indicia pertinent to the test, as indicated in FIG. 3. A manually operated knurled wheel 34 is connected to drum 32 whereby the counter drum may be reset, that is, moved to "Start" when the test is commenced.

An electric switch 35 preferably of the normally open type is mounted upon the member 19 and conductors 36 connect switch 35 through master switch 30 and a source of current (not shown) to counter 31. The switch 35 carries a movable switch arm 37, which, at its end, carries a contact roller 38. The arrangement is such that each time arm 37 is moved, an impulse is sent to the counter 31 and the drum moves through a predetermined increment which conforms to the spacing of the calibrations 33.

A cam 39 carrying an annular rib 40 is adjustably secured to member 27 by means of set screw 41. A top feeler arm 42 carried by bushing 43 is adjustably secured to member 27 by winged nut 44 and in similar fashion a bottom feeler arm 45 carried by bushing 46 is adjustably secured to said member by means of winged nut 47. In operation, as will be hereinafter more fully described, the feeler arms 42 and 45 contact, respectively, the upper and lower edges of an automobile bumper 48 and hence member 27 may be moved upwardly and downwardly in conformity with the oscillating motion of the bumper.

A collar 49 is secured to the tube 10 by means of pintles 50, the end portions of which extend radially outwardly from said collar. An abutment lever 51 is pivotally mounted upon each of the pintles 50, each lever carrying at its end an abutment lug 52. At the opposite end of each of the levers 51 a bar 53 is rigidly secured to the respective levers by means of bolts 54. The bars 53 straddle the jack and at their upper ends are joined by handle 55.

The collar 49 carries oppositely disposed latch bars 56 which are diametrically mounted upon said collar and are preferably formed integral therewith. One of the latch bars 56 is provided with a notch 57 which, in a predetermined position of the parts, engages with an offset end portion 58 of a latch lever 59. The latch lever 59 is bent at right angles to itself at its upper end portion to form a hand gripping portion 60 which extends through oppositely positioned slots 61 provided in the bars 53. A coil spring 62 is anchored at one end upon a cotter pin 63 secured to latch lever 59 and at its opposite end is anchored upon the adjacent bar 53.

The arrangement is such that bars 53 secured to levers 51 may be rocked or rotated about pintles 50 when the offset end portion 58 of the latch lever is disengaged from notch 57. However, when bars 53 are in a substantially vertical position and levers 51 are in a substantially horizontal position, the end portion 58 of the latch lever engages in notch 57 and the assembly is rendered substantially rigid. To disengage the offset end portion 58 from notch 57, the hand of an operator embracing handle 55 and member 60 squeezes said elements together, thereby lifting latch lever 59.

A pair of ears or lugs 64 are formed upon the collar 49 and carry a hinge rod 65. A shoe 66 having a substantially rectangular supporting platform 67 and opposite substantially triangular sides 68 is journaled upon the hinge rod 65. At the lower end portion of each of the sides 68 an abutment lug 69 is carried which, when the platform 67 is disposed substantially horizontally, abuts with the respective abutment lugs 52 carried upon levers 51. In this fashion when the offset end portion 58 is in engagement with notch 57, the shoe 66 is held with its platform 67 in a substantially horizontal plane, as shown best in FIG. 6.

In the operation of the device described herein for testing the shock absorbers of an automobile, the platform 1 is moved adjacent to the front or rear bumper, indicated by the numeral 48, of an automobile (not shown) whose shock absorbers are to be tested. The valve control member 11 mounted upon the upper tubular member 10 is so manipulated as to cause the tube 10 to move downwardly until the shoe 66 is positioned beneath the bumper 48. The shoe 66 is brought to a position wherein the platform 67 is substantially horizontally disposed, that is, wherein the abutment lugs 52 and 69 are in abutting relationship. In this position the offset end portion of latch lever 59 is engaged in notch 57 and hence the shoe 66 is rigidly locked in position.

The handle 12 may then be manipulated to hydraulically move the tube 10 upwardly. The collar 49 is rigidly secured to the tube 10 and hence the platform 67 of shoe 66 moves upwardly toward the lower edge of the bumper 48. The upward movement of the tube 10 is continued until the lower edge of the bumper 48 is contacted by the platform 66. In this position the spring portion of the automobile as represented by bumper 48 is in its normal static position, that is, the springs of the automobile are unflexed except to that degree caused by the weight of the sprung portion of the vehicle.

When the device is thus positioned with respect to the automobile, the upper and lower feelers 42 and 45, respectively, are disposed so as to contact the upper and lower edge of the bumper 48. In order to position the feelers 42 and 45 in the desired relationship with respect to the bumper 48, the entire assembly comprising the members 19 and 27 may be moved toward or away from the bumper of the automobile by sliding the rod 16 inwardly or outwardly with respect to the jack. In this fashion the feelers 42 and 45 may be desirably positioned with respect to the upper and lower edges of the bumper 48 respectively.

When the feelers 42 and 45 are in proper position, the cam member 39 is positioned upon the tube 27 whereby the annular rib 40 contacts wheel 38 carried upon arm 37 of switch 35. The cam 39 may then be fastened in this position by the manipulation of the set screw 41. When in this position, the drum 32 of the counter 31 may be moved by the knurled wheel 34 so as to index the drum. For instance, the drum may be so moved as to bring the indication "Start" at the top of the indicator.

The jack handle 12 is then manipulated to raise the shoe 66 whereby the bumper, that is, the sprung portion of the vehicle is raised. The springs of the vehicle then unflex and the raising is continued until substantially all of the weight is removed from the adjacent wheel of the vehicle, that is, the wheel is just about to leave the ground. Of course, the bumper may be raised a greater or lesser degree than is suggested hereinbefore, but the degree of raising described is preferred.

All of the parts are now in position to test the shock absorber and to accomplish said test the handle 55 and the transverse member 60 carried by the latch lever 59 are squeezed toward each other and the bars 53 are moved forwardly toward the automobile. The forward movement of the bars 53, that is, the counterclockwise movement thereof, as illustrated in FIG. 7, results in displacement of the abutment lugs 52 from its supporting position with respect to the abutment lugs 69. The shoe 66 is then unsupported and drops to the position shown in FIG. 7. The bumper 48 is thus unsupported and immediately falls carrying with it the feelers 42 and 45 and the tube 27 moves downwardly along the guide post 25. As the bumper falls, the cam 39 moves through the normal static position of the sprung portion of the vehicle and an impulse is sent to the device 31. Further downward movement of the bumper compresses the vehicle springs and loads the shock absorber. This initial loading of the shock absorber is herein referred to as "jounce." Immediately thereafter the springs of the automobile cause the bumper 48 to rebound and hence the rib 40 carried by the cam member 39 contacts the roller 38 of switch 35 and another electrical impulse is sent to the indicator 31. The impulses cause movement of the drum 32 and hence an indication is presented to the operator at the indicator 31. If the shock absorber is in such condition as to highly damp the springs of the automobile it is entirely possible that only one impulse will be sent by the switch 35 and the indicator will show that the shock absorber is "tight." Depending upon the condition of the shock absorbers, one or more impulses may be sent by the switch 35 to the indicator 31 as the rib 40 actuates the switch arm 37 and if the shock absorber is in poor condition, that is, if its damping effect is more or less negligible, the tube 27 responding to the vertical oscillations of the bumper 48 will cause the cam member 39 to actuate the switch 35 a plurality of times. This will be indicated by the indicator 31. Thus, the device will ascertain the degree of damping which the shock absorber exerts upon the automobile springs by measuring the number of oscillations of the tube 27.

The foregoing is graphically illustrated in FIGS. 16, 17 and 18 wherein the electrical counter produces counts which correspond to each movement of the oscillating sprung vehicle past a fixed resistance point indicated by the horizontal lines in the graphs. Thus, FIG. 16 shows a curve from the plotted amplitude and frequency of seven impulses or oscillations indicating a definitely bad condition. FIG. 17 similarly shows four oscillations which indicate a condition of fair to good; and FIG. 18 similarly shows two or three oscillations rated as good to excellent. As previously indicated, one oscillation only will be rated as "tight." On the other hand, an actual test with no shock absorbers on the car produces fourteen counts.

If desired, index marks 70 may be inscribed upon the tube 27, the upper mark of which may be indexed with, for instance, the upper portion of the sleeve 28 when the cam 39 is opposite the switch arm 37 and when the feelers 42 and 45 are adjusted to the upper and lower edges of the bumper 48 when the bumper is in static normal position. The operator, by observing the relationship of the marks 70 with respect to the sleeve 28 may observe the amplitude of the oscillations of the tube 27, giving him further information as to the characteristics of the shock absorber.

Referring particularly to FIG. 8, a modified form of indicator actuator is shown. In this form of the invention, all parts of the device being the same as hereinbefore described except as noted, the cam member 39 upon tube 27 is replaced by sleeve 71 which is adjustably secured to tube 27 by winged nut 72. The sleeve 71 carries a mirror 73 which faces member 19. A housing 74 is carried upon member 19, said housing being divided into an upper compartment 75 and a lower compartment 76. An incandescent light bulb 77 is positioned in compartment 75 and a conventional photoelectric cell 78 is positioned in compartment 76. An opening 79 is provided in the front wall 80 of compartment 75 and a similar opening 81 is provided in the front wall of compartment 76. The compartments 75 and 76 are divided by opaque wall 83 and hence light from the light source 77 can only reach the photoelectric cell through the openings 79 and 81 when the mirror 73 is so positioned as to reflect the light to the cell, as shown in FIG. 8.

The photoelectric cell is connected by suitable connections, and if necessary through an amplifier (not shown) to the indicator 31. Hence, when tube 27 oscillates vertically in response to the movement of the automobile bumper, the mirror 73 will periodically pass through a reflective position with respect to light source 77 and cell 78 and a series of impulses will be sent to the indicator 31. Thus, an indication of the condition of the shock absorber may be ascertained.

Referring particularly to FIGS. 9, 10 and 11, another modification of the invention is illustrated, the modification being particularly directed to the indicator. In this form of the invention an arm 84, corresponding to arm 20, hereinbefore described, is rigidly secured at one end to the member 19. The opposite end of the arm 84 comprises a sleeve having an aperture 85. The tube 27 extends through said aperture, but said aperture is of sufficient size to loosely receive an elongated sleeve 86. The sleeve 86 embraces tube 27 and is provided with friction rings 87 which snugly engage tube 27 in such manner that unless positively restrained, sleeve 86 will move axially with tube 27. A scale plate 88 is mounted upon sleeve 86 and the face thereof carries calibrations 89.

A ring 90 snugly embraces tube 27 above sleeve 86 and a similar ring 91 snugly embraces said tube beneath sleeve 86. The rings 90 and 91 frictionally engage tube 27 in such manner that unless positively restrained they will move axially with said tube. A pointer or needle 92 is pivoted at its end at the pivot 93 and its free end moves over scale 89. A second pointer or needle 94 is pivoted intermediate its length upon the pivot 93 and its upper free end moves over scale 89. Ring 90 carries a lug 95 to which a link 96 is pivoted, the opposite end of said link being pivotally connected to an intermediate portion of needle 92. A second link 97 is pivotally connected to a lug 98 carried by ring 91 and the opposite end of said link is pivotally connected to the lower end of needle 94.

The upper end portion of sleeve 86 is flared outwardly as at 98' in FIGS. 9, 10 and 11, whereby downward movement of the sleeve is limited. A latch 99 is mounted upon the upper portion of arm 84, said latch comprising a keeper 100 normally urged outwardly by coil spring 101. The keeper 100 may be retracted against the force of spring 101 by means of knob 102 carried upon the end of a rod 103 comprising an extension of the keeper. The arrangement is such that when the keeper is in extended position above the flared end 98' the sleeve 86 is prevented from moving either upward or downward with respect to arm 84.

In the operation of the device shown in FIGS. 9, 10 and 11, the feelers 42 and 45 may be disposed in embracing relationship with the bumper 48 before the bumper is raised by the shoe 66. The sleeve 86 will be in its lowermost position beneath keeper 100 and the indicating rings or indicators 90 and 91 will be in abutting relationship to the respective opposite ends of the sleeve 86. This will bring the needles 92 and 94 to substantially coincident position with the "zero" of scale 89.

The keeper may then be retracted and the jack manipulated to raise the shoe 66 and bumper 48. Because of the frictional relationship of rings 90 and 91 and sleeve 86 with tube 27, the rings, the sleeve and the scale will be moved upwardly as a unit. Inasmuch as the rings and sleeve do not move relatively, the needles 92 and 94 will retain their original position upon scale 89.

The latch lever may then be manipulated, as has been hereinbefore described, and the shoe 66 may be dropped from its supporting relationship with bumper 48. The sleeve 86, rings 90 and 91 and scale plate 88 will initially drop as a unit, the needles 92 and 94 being initially undisplaced. When, however, the flared portion 98' of sleeve 86 contacts arm 84, the downward movement of the sleeve ceases and keeper 100 snaps into locking position over sleeve 86. The tube 27 continues its downward movement and hence both rings 90 and 91 are respectively displaced, tube 27 moving downwardly with respect to ring 90 and ring 91 moving downwardly with respect to sleeve 86. When the tube 27 reaches its lowermost position, that is, when the shock absorber is completely loaded, the tube 27 commences its upward movement. Sleeve 86 remains locked and hence ring 90, moving with the tube, raises upwardly from the upper end of sleeve 86. Hence, needle 92 swings in a clockwise direction over scale 89. Although the swing of the needle 92 takes place due to upward displacement of the ring 90 relative to the sleeve 86, the ring 90 receives its setting upon tube 27 during the downward movement of the tube and hence the needle 92 will indicate the initial load placed on the shock absorber or "jounce."

During the downward movement of the tube 27 after sleeve 86 has been stopped, ring 91 moves away from the lower end of sleeve 86. This distance is substantially the distance below the normal position of the bumper which the bumper drops. The tube 27 then moves upwardly and when the normal position of the bumper is reached on the upward travel of the tube 27, the ring 91 again contacts the bottom of the sleeve 86 which is maintained stationary by latch 99 and the tube moves upwardly relative to the sleeve and ring 91 to set the ring to the maximum "Rebound" of the bumper. Thereafter, the rings 90 and 91 reciprocate with the tube 27 without again contacting the sleeve 86 since the amplitude of oscillation becomes less and less. When oscillation of the system ceases, the vehicle bumper and the tube 27 return to their initial zero or static position, which position is duplicated by or corresponds to the fixed position of the sleeve 86 and the scale 88. When the tube comes to rest, the rings 90 and 91 are spaced respective distances above and below the collar 86, whereby the same cause the needles to be displaced relative to zero on the scale so that the needles 92 and 94 indicate the maximum amplitude above and below the normal position of the pumper. Thus, the snubbing or damping characteristics of the shock absorber may be ascertained.

Referring particularly to FIGS. 12, 13, 14 and 15 another modified form of indicating device is shown. In these figures, the reference numeral 104 indicates a member identical with member 19, hereinbefore described, and an arm 105, equivalent to arm 84, is rigidly secured to said member. Tube 106, equivalent to tube 27, extends through an enlarged aperture 107 provided in arm 105 and said tube is embraced by sleeve 108 which also extends through aperture 107 and is freely movable therein. Sleeve 108 is frictionally related to tube 106 in the same fashion as is sleeve 86 to tube 27 and a pair of indicators or indicating discs 109 and 110 are carried on tube 106 above and below the sleeve respectively. The indicating discs 109 and 110 are also frictionally related to tube 106 in the same fashion as are rings 90 and 91 with respect to tube 27. A latch 111 is carried by arm 105 and carries a spring pressed keeper 112, the end of which may be brought into engagement with an annular groove 113 provided in tube 106. An L-shaped scale 114 is carried by sleeve 106 adjacent its upper end and a similar scale 115 is carried by said sleeve adjacent its lower end. The peripheral edges of both indicating discs 109 and 110 are chamfered, whereby said edges may conveniently and accurately indicate calibrations on the scales 114 and 115 respectively.

In the operation of the device illustrated in FIGS. 12 to 15, inclusive, the sleeve 108 is initially locked by the latch 111 and the indicating discs 109 and 110 are respectively positioned in contact with the upper and lower ends of the sleeve. The feelers (not shown) which operate in the same manner as feelers 42 and 45 are disposed in contacting relationship to the upper and lower edges of a bumper 48 while the bumper is in its normal position, that is, while the wheels of the automobile are on the ground and the springs thereof are flexed by the weight of the automobile.

The keeper 112 of latch 111 is then retracted from the groove 113 and the bumper is raised by the jack in the manner hereinbefore described. The raising of the bumper causes the tube 106 to move upwardly and by virtue of the frictional relationship of sleeve 108 and discs 109 and 110 to tube 106, the sleeve and the indicating discs move upwardly with the tube 106. The scales 114 and 115 being rigidly carried by the sleeve 108 move upwardly with said sleeve.

The support for the bumper is then removed and the tube 106 moves downwardly. With the initial movement of the sleeve 108 downwardly with tube 106, discs 109 and 110 move downwardly in fixed relationship to the sleeve 108. When the tube 106 has moved downwardly to the point where the bumper was in its normal position, the keeper 112 snaps into the groove 113 and further downward movement of the sleeve 108 is prevented. However, tube 106 continues its downward movement and hence said tube moves downwardly relative to the stopped disc 109, the stopped sleeve 108, and carries the disc 110 downwardly away from the lower end of the sleeve 108. In this fashion the disc 109 is moved relatively upwardly upon the tube 106 a distance equal to the movement of the tube below the normal position of the bumper.

Eventually, the tube 106 reaches its lowermost position, that is, the position where the maximum impulse is applied to the shock absorber. The bumper then rebounds and the tube 106 moves upwardly. The sleeve 108 remains locked and hence when the tube 106 moves upwardly, it moves relative to the sleeve 108 but it carries the disc 109 upwardly therewith. The disc 110 is also carried upwardly with the tube 106 and when the tube moves upwardly above the normal position of the bumper 48, the tube 106 moves upwardly relative to the disc 110 which has been stopped by the lower end of the sleeve 108.

The discs 109 and 110 are then displaced a distance above and below the upper and lower ends of the sleeve 108 which is respectively equal to the maximum "jounce" and maximum "rebound" of the bumper 48. When the system thereafter comes to rest, the maximum "jounce" may be read upon the scale 114 as indexed by the disc 109 and the maximum rebound may be read upon a scale 115 as indexed by the disc 110. Thus, the snubbing or damping effect of the shock absorber under test may be ascertained.

I claim:

1. A portable device for testing automobile shock absorbers in situ upon an automobile having a sprung portion and supporting wheels, said device comprising, a movable support, an automobile jack carried by said support for raising the sprung portion of an automobile to lift a portion of the weight thereof from the wheels, means connected to said jack for instantaneously disengaging the jack from said sprung portion of the automobile to permit free fall and vertical oscillation of said sprung portion of the automobile upon the wheels, a vertically movable member mounted upon said support, engaging means rigidly mounted upon said member for engaging the sprung portion of the automobile, said engaging means being responsive to the oscillatory rise and fall of said sprung portion after it has been permitted to drop, a gauge support frictionally carried upon said movable member, annular elements frictionally carried upon said movable member in contacting relationship with the top and bottom of said gauge support, means carried by said movable support for locking said gauge support and rendering it immovable with respect to said movable support, and means carried by said gauge support for indicating the displacement of said annular elements from said gauge support after oscillation of said movable member.

2. A portable device for testing automobile shock absorbers in situ upon an automobile having a sprung portion and supporting wheels, said device comprising, a movable support, an automobile jack carried by said support for raising the sprung portion of an automobile to lift a portion of the weight thereof from the wheels, means connected to said jack for instantaneously disengaging the jack from said sprung portion of the automobile to premit free fall and vertical oscillation of said sprung portion of the automobile upon the wheels, a vertically movable member mounted upon said support, engaging means rigidly mounted upon said member for engaging the sprung portion of the automobile, said engaging means being responsive to the oscillatory rise and fall of said sprung portion after it has been permitted to drop, a gauge support frictionally carried upon said movable member, annular elements frictionally carried upon said movable member in contacting relationship with the top and bottom of said gauge support, gauge means carried by said gauge support, said gauge means comprising a calibrated gauge plate and a pair of pointers independently movable relative to said calibrations, means carried by said movable support for locking said gauge support and rendering it immovable with respect to said movable support, means for connecting each annular member to a respective pointer to indicate the respective maximum displacement of each annular element with respect to an adjacent end of said gauge support after oscillation of said movable member.

3. A portable device for testing automobile shock absorbers in situ upon an automobile having a sprung portion and supporting wheels, said device comprising, a movable support, an automobile jack carried by said support for raising the sprung portion of an automobile to lift a portion of the weight thereof from the wheels, means connected to said jack for instantaneously disengaging the jack from said sprung portion of the automobile to permit free fall and vertical oscillation of said sprung portion of the automobile upon the wheels, a vertically movable member mounted upon said support, engaging means rigidly mounted upon said member for engaging the sprung portion of the automobile, said engaging means being responsive to the oscillatory rise and fall of said sprung portion after it has been permitted to drop, a gauge support frictionally carried upon said movable member, annular elements frictionally carried upon said movable member in contacting relationship with the top and bottom of said gauge support, gauge means carried by said gauge support, said gauge means comprising a calibrated scale member carried upon each respective end of said gauge support, means carried by said movable support for locking said gauge support and rendering it immovable with respect to said movable support, said calibrated scale members being disposed adjacent said respective annular elements whereby the respective maximum displacement of each annular element is indicated upon a respective scale after oscillation of said movable member.

4. In a shock absorber testing device operable upon free fall and vertical oscillation of the sprung portion of an automobile relative to its unsprung portion, the improvement comprising a support having a fixed position relative to the unsprung portion of the automobile, a feeler assembly movably mounted on said fixed support and adapted to be coupled to the sprung portion of the automobile for vertical oscillation therewith, a gauge support frictionally carried upon said assembly, a pair of indicators frictionally carried upon said assembly in contacting engagement respectively with the opposite ends of said gauge support, and locking means mounted on said fixed support and engageable with said gauge support for detachably locking said gauge support to said fixed support and for accommodating displacement of said indicators relative to said gauge support upon vertical oscillation of said assembly with the sprung portion of the automobile.

References Cited in the file of this patent

UNITED STATES PATENTS

| | | |
|---|---|---|
| 1,891,613 | Widney | Dec. 20, 1932 |
| 2,133,843 | Berry | Oct. 18, 1938 |
| 2,728,220 | Willner | Dec. 27, 1955 |
| 2,764,020 | Gadd | Sept. 25, 1956 |